United States Patent
Furukawa et al.

(10) Patent No.: US 6,203,951 B1
(45) Date of Patent: Mar. 20, 2001

(54) COLOR FILTER FOR LIQUID CRYSTAL DISPLAYS

(75) Inventors: Tadahiro Furukawa; Tatsuhiko Murai; Atsushi Takahashi, all of Tokyo (JP)

(73) Assignee: Kyodo Printing Co., Ltd., Tokyo (JP)

( * ) Notice: Subject to any disclaimer, the term of this patent is extended or adjusted under 35 U.S.C. 154(b) by 0 days.

(21) Appl. No.: 09/202,253

(22) PCT Filed: Apr. 15, 1998

(86) PCT No.: PCT/JP98/01716

§ 371 Date: Dec. 10, 1998

§ 102(e) Date: Dec. 10, 1998

(87) PCT Pub. No.: WO98/47027

PCT Pub. Date: Oct. 22, 1998

(30) Foreign Application Priority Data

Apr. 15, 1997 (JP) .................................................. 9-114397

(51) Int. Cl.⁷ .............................. G02B 5/20; G02F 1/1335
(52) U.S. Cl. .................................................. 430/7; 349/106
(58) Field of Search ................................ 430/7; 349/106

(56) References Cited

U.S. PATENT DOCUMENTS

| | | |
|---|---|---|
| 4,808,501 | 2/1989 | Chiulli . |
| 4,837,098 | 6/1989 | Shimamura . |
| 4,876,165 | 10/1989 | Brewer et al. . |
| 4,889,410 | * 12/1989 | Elwood ............................. 350/3.7 |
| 5,176,971 | 1/1993 | Shimamura et al. . |
| 5,478,680 | * 12/1995 | Hishiro et al. ......................... 430/7 |
| 5,500,751 | 3/1996 | Takao et al. . |
| 5,548,424 | 8/1996 | Takao et al. . |
| 5,568,293 | 10/1996 | Hishiro et al. . |
| 5,731,110 | 3/1998 | Hishiro et al. . |

FOREIGN PATENT DOCUMENTS

| | | |
|---|---|---|
| 61-180202 | 12/1986 | (JP) . |
| 61-180203 | 12/1986 | (JP) . |
| 62-150202 | 4/1987 | (JP) . |
| 63-13968 | 1/1988 | (JP) . |
| 63-60423 | 3/1988 | (JP) . |
| 63-112592 | 5/1988 | (JP) . |
| 63-146002 | 6/1988 | (JP) . |
| 63-217304 | 9/1988 | (JP) . |
| 1-501973 | 6/1989 | (JP) . |
| 2-127602 | 5/1990 | (JP) . |
| 5-119212 | 5/1993 | (JP) . |
| 6-59114 | 3/1994 | (JP) . |
| 7-84114 | 3/1995 | (JP) . |
| 7-173432 | 9/1995 | (JP) . |
| 7-248491 | 9/1995 | (JP) . |
| 8-82708 | 3/1996 | (JP) . |
| 8-304816 | 11/1996 | (JP) . |
| 9-68608 | 3/1997 | (JP) . |
| 9-69608 | 3/1997 | (JP) . |
| 9-120163 | 5/1997 | (JP) . |
| 9-297212 | 11/1997 | (JP) . |
| 94/18274 | 8/1994 | (WO) . |

* cited by examiner

*Primary Examiner*—John A. McPherson
(74) *Attorney, Agent, or Firm*—Pitney, Hardin, Kipp & Szuch, LLP

(57) ABSTRACT

A reflection-type color filter (30) is disclosed, in which light coming into one surface of a color filter layer (36) is reflected by a reflective layer (40) and allowed to pass through the color filter layer (36) twice. Colored patterns of the color filter layer (36) include resin such as polyimide and dye for dyeing the resin. The thickness of the colored patterns is 0.7 $\mu$m or less. In order to enhance light resistance, it is effective to increase the content of dye with respect to resin. The value of 0.7 $\mu$m is established in consideration of enhancement of optical characteristic and light resistance of the color filter used in the reflection type liquid crystal display device. In order to enhance light resistance, more preferably, a metal complex is added to the resin.

16 Claims, 1 Drawing Sheet

COLOR FILTER FOR LIQUID CRYSTAL DISPLAYS

TECHNICAL FIELD

This invention relates to a color filter for displaying an image in color on a liquid crystal display device, and more particularly to a color filter of the type in which color density is thin and dye is used as a colorant.

BACKGROUND OF INVENTION

As a method for producing a color filter used in a liquid crystal display device, there are known methods for applying a color using pigment, such as a pigment dispersing method or an electrodeposition method, and for applying a color(s) using dye, such as a dyeing method or a dye dissolution method. Usually, a color filter layer consists or three primary colors, red, green and blue. The colored patterns of the color filter layer having a coating thickness of 1 to 2 μm are formed in a mosaic pattern or in a stripe pattern.

In general, it is said that although dye is superior in transparency and purity of color and more abundant in kind compared with pigment, the former is inferior in light resistance to the latter. Also, it is known that color material such as pigment and dye is usually susceptible to fading on exposure to light due to oxidation and especially due to singlet oxygen produced by light (some colorant acts as a catalyst in this reaction)

However, the abovementioned general knowledge about fading is not applicable to the color filter used in a liquid crystal display device because such a color filter is panelized and then assembled in the display device and therefore, the inside of the panel is completely isolated From air, thus prohibiting progress of fading due to oxidation. This can easily be understood from the following facts. When, for example, a phthalocyanine-based dye, which is widely known as having a good light resistance, is used as a colorant for a color filter used in a liquid crystal display device, the dye is readily changed in color in spite of the fact that it is used in a circumstance completely isolated from air. In contrast, when a xanthene-based dye such as rhodamine, which is generally considered as being inferior in light resistance, is used as a colorant for a color filter, the dye is not readily changed in color and it can exhibit a strong light resistance in spite of the fact that it is used in the same circumstance where the dye is completely isolated from air.

Heretofore, color filters used in liquid crystal display devices have been manufactured by properly selecting dyes having a good light resistance based on experiences, utilizing the aforementioned special circumstance.

Recently, among liquid crystal display devices, the reflection type liquid crystal display devices drew much attention in order to obtain portable terminal devices with a color display capability. Since the reflection type liquid crystal display devices can be advantageously used as portable display devices in view of reduced consumption of power because the reflection type liquid crystal devices utilize natural light surrounding the devices instead of using a back light.

As one way for providing a color display capability to the reflection type liquid crystal display devices, a color filter is used. Such reflection type liquid crystal display devices themselves include, as discussed, for example, in Japanese Patent Unexamined Publication (KOKAI) No. Hei 8-304816 or Hei 9-68608, a color filter disposed on a surface of a liquid crystal layer as an optical shutter and adapted to provide a color display capability, and a reflective layer disposed on the other surface and having a light reflective function. In this method using a color filter, a wider color displaying range can be enjoyed easily by as making the background color paper white. Therefore, this method is advantageous compared with others using no color filter.

Incidentally, with respect to a color filter used in a reflection type liquid crystal display device, usually, a technique of manufacture following the method of manufacturing a transmission type color filter is solely used. However, it is demanded for the reflection type liquid crystal display device that brightness as much bright as possible ((i.e., thin in color) is ensured as a color filter because an incident light coming from the surroundings of the display device passes (penetrates) through the color filter twice and in addition, a color reproduction range is as large as possible. Also, besides the primary colors red (R), green (G) and blue (B), complementary colors yellow (Y), cyan (C) and magenta (M) are used. The color filter itself using dye is known per se. It is also known that the filter using dye is good in light resistance (for example, see U.S. Pat. No. 4,837,098).

DISCLOSURE OF INVENTION

No study has been made on color filters for thin color as 4 to 40% of a minimum value (420 to 610 nm) of a spectral transmission factor for each color, as used in a reflection type liquid crystal display device till today. Also, all findings on light resistance are those obtained by a color filter for thick color.

It was known through experiments that a mere application of dye, which was supposed to have good light resistance, to a colorant of a color filter used in a reflection type liquid crystal display device results in inferior light resistance, thus making such a color filter entirely unusable.

Generally, it is known for colorants such as pigment and dye, those for thin color are decreased in light resistance than those for thick color. However, no comparable findings are so far obtained in such a special circumstance as in a state of no oxygen as in a liquid crystal display device, where a general common knowledge is not applicable.

It was not known that an application of dye, which was supposed to have good light resistance, to a color filter for thin color as used in a reflection type liquid crystal display device, enhances light resistance.

The dye-based color filters have another shortcoming that absorption of light occurs in light transmission regions for respective color patterns under the effect of interference by a coating thickness of the color filter because planarity of the surface of the color filter is good and as a result, the light transmission factor is decreased to darken the color filter in some instances.

Furthermore, in the conventional color filter used in a transmission type liquid crystal display device, this can be neglected without any substantial problem because an interval between maximum values of absorption of light is too small to control (exceeding the control range of the coating thickness) due to the coating thickness so large as 1 to 2 μm and because chromaticity of the color patterns is, practically, hardly affected.

However, in the color filter used in the reflection type liquid crystal display device contrary to the color filter used in the transmission type liquid crystal display device, absorption of light caused by interference is effective by two powers because light passes through the color filter twice. Moreover, since the color patterns themselves constituting the color filter are thin, color purity is greatly affected.

The present invention aims at providing a color filter capable of exhibiting similar display characteristics to the conventional color filter used in a transmission type liquid crystal display device, by using dye having good transparency and color purity.

It is another object of the present invention to provide a technique capable of enhancing light resistance even in case the colors of the colored patterns constituting the color filter become thinner.

In a color filter for a liquid crystal display device according to the present invention, colored patterns of a color filter layer include resin and dye for dyeing the resin and the thickness of the colored patterns is 0.7 μm or less. Because the thickness of the colored patterns enhances the coating density of the dye, the thinner the better in view of enhancement of light resistance. However, if the thickness is too small, the colored patterns cannot withstand the manufacturing process. For example, there is a fear that dye is eluded out of the resin. In case of employment of a process including a wet etching and a process for coating a dye to the colored patterns and a protective film in overlapped relation, if the thickness of the colored patterns is 0.2 μm or less, the dye tends to elude. Therefore, the thickness of the colored patterns is preferably 0.2 μm or more.

The reason why the thickness of the colored patterns is set to 0.7 μm or less is that the region of wavelengths for absorbing light and its irregularity (in-surface and between the substrates) can be controlled by the coating thickness.

In order to enhance the light resistance, it is effective to increase the content of dye against resin. The value of 0.7 μm is established in consideration of optical characteristics and light resistance of the color filter used in the reflection type liquid crystal display device in view of chromaticity of the color filter, a minimum transmission factor of each color, especially at 420 to 610 nm in the visible region, is preferably 5 to 55% (more preferably, 25 to 30%), and a maximum transmission factor at 400 to 700 nm is preferably 70% or more (more preferably, 85% or more). In case the thickness of the colored patterns is 0.2 to 0.7 μm, the weight ratios of dye to resin are in a range of from 0.07:1 to 0.7:1 for the xanthene-based dye as illustrated in the chemical formulas 1 and 2 and the triphenylmethane-based eye as illustrated in the chemical formula 3, from 0.4:1 to 1.0:1 for the metal-contained azo-based dye or the azo-based dye as illustrated in the chemical formula 4, from 0.04:1 to 0.3:1 for the cyanine-based eye as illustrated in the chemical formula 5, and from 0.5:1 to 1.0:1 for the anthraquinone-based dye not illustrated in a chemical formula, respectively.

Chemical formula 1

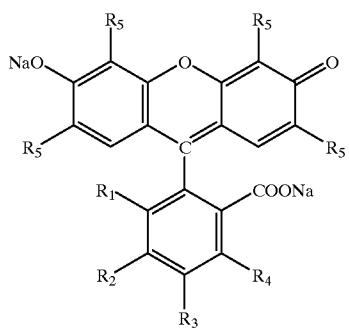

Chemical formula 2

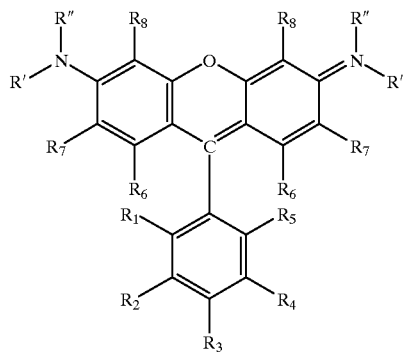

$R_1$~$R_4$ = H, Cl
$R_5$ = H, Br, I $R_1$~$R_5$ = H, COOH, COONa
$SO_3H$, $SO_3Na$, alkyl
$R_6$~$R_8$ = H, $CH_3$ etc., alkyl R′, R″ = alkyl,

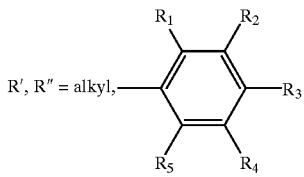

Chemical formula 3

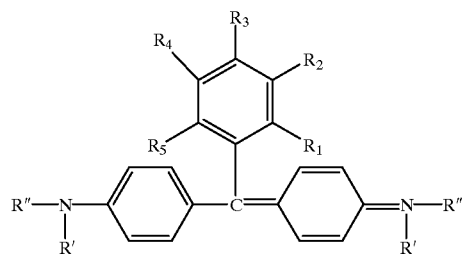

$R_1$~$R_5$ = H, $SO_3Na$, Cl
R′, R″ = $CH_3$, $C_2H_5$ etc., alkyl or

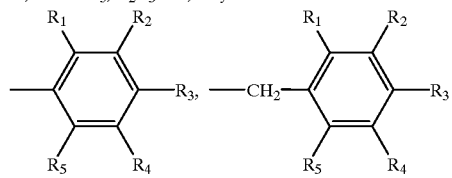

Chemical formula 4

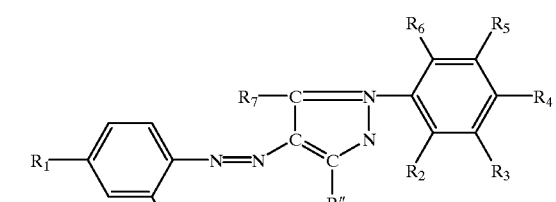

2:1 Cr complex $R_1$ = H, Cl, $SO_3HSO_2NH_2$, NO
$R_2$~$R_6$ = H, Cl, $CH_3$, $SO_3H$, $OCH_3$
R′, R″ = OH, COOH Chemical formula 5

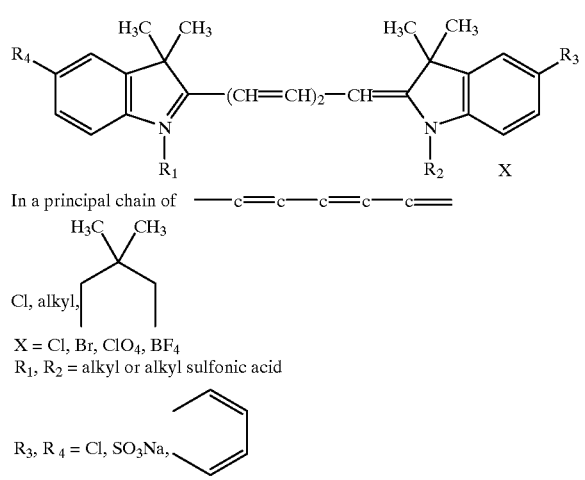

In a principal chain of —c=c—c=c—c=

Cl, alkyl,

X = Cl, Br, ClO$_4$, BF$_4$
R$_1$, R$_2$ = alkyl or alkyl sulfonic acid

R$_3$, R$_4$ = Cl, SO$_3$Na,

By using the dyes having a certain skeleton as expressed by structural formulas of those chemical formulas 1 to 5, etc., a color filter for a liquid crystal display device having an improved light resistance could be obtained.

Colors could be obtained by using plural kinds of dyes in that case, the weight ratios oft the dyes to the resin are in proportion to the values in the abovementioned ranges. For example for the azo-based dye, if it is used in combination with the metal-contained azo-based dye, the light resistance can be enhanced more effectively.

In order to enhance the light resistance, it is more preferred that a metal complex is added to a resin. The weight ratio of the additives to the resin may be in a range of from 0.01:1 to 0.3:1 The metal complex preferably includes dialkyl phosphate, dialkyl-dithiocarbanate or benzene dithiol or analogous dithiol thereof, and the like. The metal may include nickel, copper, or cobalt and the like. Those metal complexes are generally known as a singlet oxygen quencher and used for enhancing the light resistance of color elements for absorbing infrared rays such as CD-R. This was used for the purpose of enhancing the light resistance under the presence of oxygen. In this invention, it was found out that those metal complexes are effective in enhancement of the light resistance of dye under such a special circumstance as absence or oxygen.

First, with respect to the light resistance, it is demanded that the chromatic difference ΔEab* before and after the time for irradiating light using a carbon arc meter is 5 or less, and preferably 3 or less. Although the test at that time is carried out preferably in a panelized form and under the absence of oxygen, an evaluation can likewise be made in such a way as to adhere a sheet of glass on the colored patterns of the color filter through an adhesive agent (viscous agent) or form an air-impermeable fine film (for example, ITO) on the color filter.

Conventionally, in the color filter used in a transmission type liquid crystal display device, only if a dye satisfying the test using a carbon arc is properly selected, a colored filter having a good light resistance can be obtained easily.

In order to enhance the light resistance of the color filter having a thin color used in a reflection type liquid crystal display device, it is useful to enhance the content of dye against resin. However, the weight ratio thereof must be determined in a certain range in view of light absorptive coefficient of the dye, thickness of the color required for the color filter, light resistance of the skeleton itself of the dye, and withstandability to the process at the time for manufacturing a color filter (for example, color elusion in the developing process or in the process for forming a next color) After the weight ratio of the dye to the resin is established, it is necessary to considerably reduce the coating thickness compared with the color filter used in the transmission type liquid crystal display device in order to obtain a filter of a thin color.

From the foregoing, the thickness of the colored patterns constituting the color filter must essentially be 0.7 μm or less, preferably 0.2 μm or more to 0.6 μm or less.

Next, in respect of color purity, it is important that absorption of light due to interference caused by the coating thickness of the color filter is not located in the wavelength regions where the value of an isochromatic function is large at the position where light of each color transmits in the XYZ color system. In case the color filter consists of three primary colors red, green and blue, interference due to the coating thickness can be avoided easily because the light transmission regions are comparatively small. However, in the complementary color system of yellow, magenta and cyan, the coating Thickness capable of avoiding interference is limited because the light transmission regions are large. The colored patterns constituting the color filter are usually formed by coating while appropriately controlling the coating thickness using a spin coater, a roll coater, a bar coater, or the like. Irregularity in and between the transparent substrates on which the colored patterns are formed, is about ±5%. A refraction index of the resin containing the dye used for forming the colored patterns is about 1.45 to 2.0.

An arrangement should be such that no interference occurs in the light transmission region of each colored pattern in relation between the colored patterns formed in the transparent substrate and the refraction index. The reason is that an occurrence of interference causes the transmission factor to be decreased while the transmission factor in the light transmission regions is higher the better in view of obtaining a bright color filter. In order to avoid interference, the coating thickness of the colored patterns of the color filter used in the reflection type liquid crystal display device must essentially be 0.7 μm or less.

A calculation based on a refraction index of 1.8 of the resin of the colored patterns reveals that a difference in coating thickness causing an occurrence of absorption maximum and absorption minimum due to interference of light at the same wavelength is 0.0625 μm at 450 nm. If the coating thickness is varied to this extent, interference occurs in the light transmission regions to cause the color filter to become darker by about 10%. An allowable range of: the coating thickness for causing an occurrence of interference is essentially be a half or less of this difference in coating thickness. This can be obtained by the following calculation. 0.0625× 0.5/0.05=0.625 μm. In consideration of the range of refraction index of the resin used in the colored patterns, the coating thickness of the colored patterns forming the color filter must be 0.7 μm or less all the same. It goes without saying that the coating thickness can be controlled more effectively as the coating thickness is more reduced, and uniformity of color is enhanced.

Figure 1:
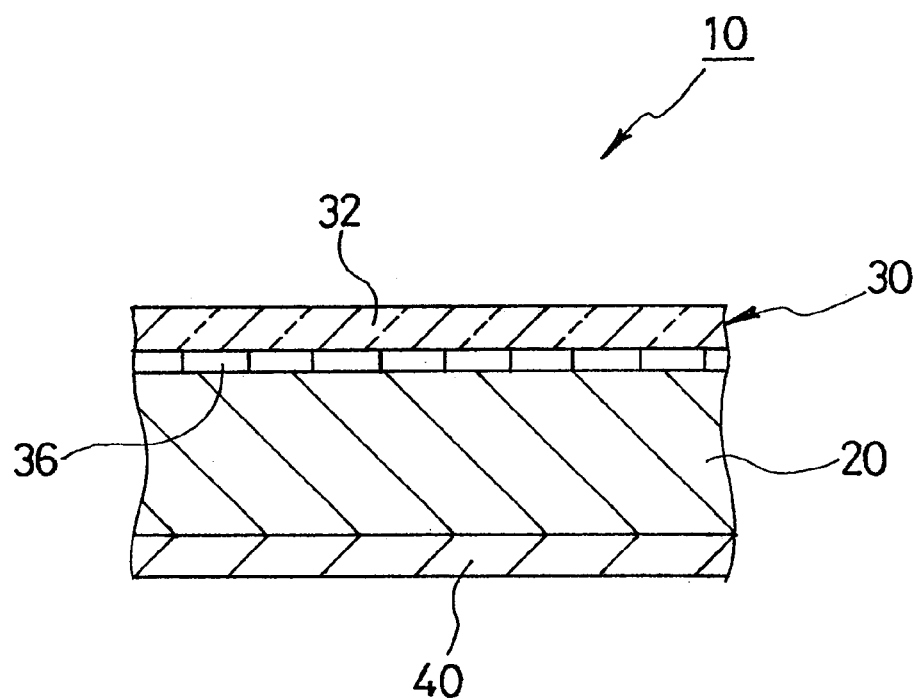
FIG. 1 is a sectional view showing one example of a color filter incorporated with the present invention.

Best Mode for Carrying Out the Invention

Colored patterns having a refraction index of n=1.80 and a coating thickness of d (μm) were prepared. And for those colored patterns which were larger in refraction index than a transparent substrate, a maximum value and a minimum value caused by interference of transmission light at a surface of each colored pattern were obtained. The results are shown in Tables 1 to 28. The determination of an optimum condition for the thickness of each colored pattern was made as follows.

In case at least one maximum value is located in main wavelength transmission regions (the portions where the sensitivity of visual perception of transmission of the respective three stimulation values X, Y, Z of the colors of the colored patterns is high, that is, X: 580 to 620 nm, Y: 520 to 580 nm, Z: 420 to 480 nm) but no minimum value is located in those regions:

1) Yellow

In case of m=1, the coating thickness is 0.155 μm. This is too thin in actual practice and thus infeasible.

TABLE 1

$d = 0.31 \mu m$

| | m = 5 | m = 4 | m = 3 | m = 2 | m = 1 | determination |
|---|---|---|---|---|---|---|
| maximum transmission wavelength (nm) | | | 372 | 558 | 1116 | ○ |
| minimum transmission wavelength (nm) | | | 319 | 446 | 744 | |

TABLE 2

$d = 0.465 \mu m$

| | m = 5 | m = 4 | m = 3 | m = 2 | m = 1 | determination |
|---|---|---|---|---|---|---|
| maximum transmission wavelength (nm) | 335 | 419 | 558 | 837 | | ○ |
| minimum transmission wavelength (nm) | | 372 | 478 | 670 | 1116 | |

TABLE 3

$d = 0.62 \mu m$

| | m = 6 | m = 5 | m = 4 | m = 3 | m = 2 | determination |
|---|---|---|---|---|---|---|
| maximum transmission wavelength (nm) | 372 | 446 | 558 | 744 | 1116 | Δ |
| minimum transmission wavelength (nm) | 343 | 405 | 496 | 638 | 893 | |

TABLE 4

$d = 0.775 \mu m$

| | m = 7 | m = 6 | m = 5 | m = 4 | m = 3 | determination |
|---|---|---|---|---|---|---|
| maximum transmission wavelength (nm) | 399 | 465 | 558 | 698 | 930 | x |

TABLE 4-continued $d = 0.775 \mu m$

| | m = 7 | m = 6 | m = 5 | m = 4 | m = 3 | determination |
|---|---|---|---|---|---|---|
| minimum transmission wavelength (nm) | | 429 | 507 | 620 | 797 | |

2) Magenta

TABLE 5

$d = 0.25 \mu m$

| | m = 5 | m = 4 | m = 3 | m = 2 | m = 1 | determination |
|---|---|---|---|---|---|---|
| maximum transmission wavelength (nm) | | | | 450 | 900 | x |
| minimum transmission wavelength (nm) | | | | 360 | 600 | |

TABLE 6

$d = 0.375 \mu m$

| | m = 5 | m = 4 | m = 3 | m = 2 | m = 1 | determination |
|---|---|---|---|---|---|---|
| maximum transmission wavelength (nm) | | 338 | 450 | 675 | 1350 | ○ |
| minimum transmission wavelength (nm) | | | 386 | 540 | 900 | |

TABLE 7

$d = 0.50 \mu m$

| | m = 6 | m = 5 | m = 4 | m = 3 | m = 2 | determination |
|---|---|---|---|---|---|---|
| maximum transmission wavelength (nm) | | | 450 | 600 | 900 | ○ |
| minimum transmission wavelength (nm) | | | 400 | 514 | 720 | |

TABLE 8

$d = 0.625 \mu m$

| | m = 6 | m = 5 | m = 4 | m = 3 | m = 2 | determination |
|---|---|---|---|---|---|---|
| maximum transmission wavelength (nm) | 375 | 450 | 563 | 750 | 1125 | Δ |
| minimum transmission wavelength (nm) | | 410 | 500 | 643 | 900 | |

TABLE 9 d = 0.75 μm

| | m = 7 | m = 6 | m = 5 | m = 4 | m = 3 | determination |
|---|---|---|---|---|---|---|
| maximum transmission wavelength (nm) | 385 | 450 | 540 | 675 | 900 | x |
| minimum transmission wavelength (nm) | | 415 | 491 | 600 | 771 | |

3) Cyan

In case of m=1, the coating thickness is 0.133 μm. This is too thin in actual and thus infeasible.

TABLE 10 d = 0.266 μm

| | m = 5 | m = 4 | m = 3 | m = 2 | m = 1 | determination |
|---|---|---|---|---|---|---|
| maximum transmission wavelength (nm) | | | | 479 | 958 | ○ |
| minimum transmission wavelength (nm) | | | | 383 | 638 | |

TABLE 11 d = 0.400 μm

| | m = 5 | m = 4 | m = 3 | m = 2 | m = 1 | determination |
|---|---|---|---|---|---|---|
| maximum transmission wavelength (nm) | | 360 | 480 | 720 | 1440 | ○ |
| minimum transmission wavelength (nm) | | | 411 | 576 | 960 | |

TABLE 12 d = 0.532 μm

| | m = 6 | m = 5 | m = 4 | m = 3 | m = 2 | determination |
|---|---|---|---|---|---|---|
| maximum transmission wavelength (nm) | | 383 | 478 | 638 | 958 | Δ |
| minimum transmission wavelength (nm) | | | 426 | 547 | 766 | |

TABLE 13 d = 0.665 μm

| | m = 7 | m = 6 | m = 5 | m = 4 | m = 3 | determination |
|---|---|---|---|---|---|---|
| maximum transmission wavelength (nm) | | 399 | 479 | 599 | 798 | X |
| minimum transmission wavelength (nm) | | 368 | 435 | 532 | 684 | |

It should be noted that the above values were obtained at the same refraction index in the region of wavelength of 400 to 700 nm but actually, the refraction indexes are slightly different depending on wavelength.

Next, a case where the colored patterns are smaller in refraction index than the transparent substrate will be described. In this case, a phase difference, λ/2, occurs to light reflected by the surface of the transparent substrate.

In case the colored patterns have a refraction index n=1 and a coating thickness d (μm) and the colored patterns are smaller in refraction index than the transparent substrate;

4) Yellow

TABLE 14 d = 0.28 μm

| | m = 5 | m = 4 | m = 3 | m = 2 | m = 1 | determination |
|---|---|---|---|---|---|---|
| maximum transmission wavelength (nm) | | | | 280 | 560 | ○ |
| minimum transmission wavelength (nm) | | | | 336 | 840 | |

TABLE 15 d = 0.47 μm

| | m = 5 | m = 4 | m = 3 | m = 2 | m = 1 | determination |
|---|---|---|---|---|---|---|
| maximum transmission wavelength (nm) | | | 403 | 564 | 940 | ○ |
| minimum transmission wavelength (nm) | | 353 | 470 | 705 | | |

TABLE 16 d = 0.65 μm

| | m = 6 | m = 5 | m = 4 | m = 3 | m = 2 | determination |
|---|---|---|---|---|---|---|
| maximum transmission wavelength (nm) | | 355 | 433 | 557 | 780 | ○ |
| minimum transmission wavelength (nm) | | | 390 | 488 | 650 | |

TABLE 17

| | d = 0.84 μm | | | | |
|---|---|---|---|---|---|
| | m = 7 | m = 6 | m = 5 | m = 4 | m = 3 | determination |
| maximum transmission wavelength (nm) | | 388 | 458 | 560 | 720 | Δ |
| minimum transmission wavelength (nm) | | 420 | 504 | 630 | 840 | |

TABLE 18

| | d = 1.03 μm | | | | |
|---|---|---|---|---|---|
| | m = 8 | m = 7 | m = 6 | m = 5 | m = 4 | determination |
| maximum transmission wavelength (nm) | | 412 | 475 | 562 | 678 | X |
| minimum transmission wavelength (nm) | 386 | 441 | 515 | 618 | 773 | |

5) Magenta (conditions for the maximum value coming proximate to 450 nm)

TABLE 19

| | d = 0.22 μm | | | | |
|---|---|---|---|---|---|
| | m = 5 | m = 4 | m = 3 | m = 2 | m = 1 | determination |
| maximum transmission wavelength (nm) | | | | 264 | 440 | X |
| minimum transmission wavelength (nm) | | | | 330 | 660 | |

TABLE 20

| | d = 0.37 μm | | | | |
|---|---|---|---|---|---|
| | m = 5 | m = 4 | m = 3 | m = 2 | m = 1 | determination |
| maximum transmission wavelength (nm) | | | 317 | 444 | 740 | ○ |
| minimum transmission wavelength (nm) | | | 370 | 555 | | |

TABLE 21

| | d = 0.52 μm | | | | |
|---|---|---|---|---|---|
| | m = 6 | m = 5 | m = 4 | m = 3 | m = 2 | determination |
| maximum transmission wavelength (nm) | | | 347 | 446 | 624 | ○ |
| minimum transmission wavelength (nm) | | | 390 | 520 | 780 | |

TABLE 22

| | d = 0.67 μm | | | | |
|---|---|---|---|---|---|
| | m = 6 | m = 5 | m = 4 | m = 3 | m = 2 | determination |
| maximum transmission wavelength (nm) | | 365 | 447 | 574 | 804 | ○ |
| minimum transmission wavelength (nm) | | 402 | 503 | 670 | | |

TABLE 23

| | d = 0.82 μm | | | | |
|---|---|---|---|---|---|
| | m = 7 | m = 6 | m = 5 | m = 4 | m = 3 | determination |
| maximum transmission wavelength (nm) | | 379 | 448 | 548 | 704 | X |
| minimum transmission wavelength (nm) | | 411 | 493 | 616 | 821 | |

6) Cyan

TABLE 24

| | d = 0.24 μm | | | | |
|---|---|---|---|---|---|
| | m = 5 | m = 4 | m = 3 | m = 2 | m = 1 | determination |
| maximum transmission wavelength (nm) | | | | 288 | 480 | ○ |
| minimum transmission wavelength (nm) | | | | 360 | 720 | |

TABLE 25

| | d = 0.40 μm | | | | |
|---|---|---|---|---|---|
| | m = 5 | m = 4 | m = 3 | m = 2 | m = 1 | determination |
| maximum transmission wavelength (nm) | | | 343 | 480 | 800 | ○ |
| minimum transmission wavelength (nm) | | | 400 | 600 | | |

TABLE 26

| | d = 0.56 μm | | | | |
|---|---|---|---|---|---|
| | m = 6 | m = 5 | m = 4 | m = 3 | m = 2 | determination |
| maximum transmission wavelength (nm) | | | 373 | 480 | 672 | ○ |
| minimum transmission wavelength (nm) | | | 420 | 560 | 840 | |

TABLE 27 d = 0.72 μm

|  | m = 6 | m = 5 | m = 4 | m = 3 | m = 2 | determination |
|---|---|---|---|---|---|---|
| maximum transmission wavelength (nm) |  |  | 393 | 480 | 617 | Δ |
| minimum transmission wavelength (nm) |  | 360 | 432 | 540 | 720 |  |

TABLE 28 d = 0.88 μm

|  | m = 7 | m = 6 | m = 5 | m = 4 | m = 3 | determination |
|---|---|---|---|---|---|---|
| maximum transmission wavelength (nm) |  | 406 | 480 | 586 | 754 | X |
| minimum transmission wavelength (nm) | 377 | 440 | 528 | 660 | 880 |  |

Furthermore, the present invention can be applied to a color filter for a reflection type liquid crystal display device including two or more kinds of mutually different colored patterns such as those consisting of three primary colors, red, green and blue, or those consisting of complementary colors such as yellow, magenta and cyan, or those consisting of two colors, orange and green.

Also, a color filter composed of colored patterns consisting of six patterns of YMC and RGB can be formed by forming colored patterns of RGB by partially overlapping each colored pattern of YMC by means of forming a color pattern R by overlapping, for example, M and Y out of the colored patterns YMC of complementary colors.

Example of Application/Industrial Applicability of the Invention

FIG. 1 shows a sectional construction of a reflection type color liquid crystal display device including a color filter. The color liquid crystal display device 10 includes a color filter disposed on one surface of a host guest liquid crystal 20 and a reflection layer 20 on the other surface. The color filter itself is comprised of a transparent substrate 40 such as a sheet of glass and a color filter layer 36 including colored patterns consisting of three colors YMC (yellow, magenta and cyan) formed on the substrate 32. The respective colored patterns of the color filter layer 36 can be formed, for example, by a photolithographic technique which is well known in the art for manufacturing a transmission type color filter.

The composition, coating thickness and minimum transmission factor of each YMC-based color pattern was set as indicated hereinafter and each colored pattern was exposed to light using a carbon arc fade meter for 100 hours and thereafter, data of color difference ΔEab* were obtained.

Color Pattern of Magenta

A xanthene-based dye (acid red 87) was added to a polyimide resin in a weight ratio of 0.1:1 to 0.3:1. By doing so, two kinds of colored patterns of magenta color having a thickness of 0.26 to 0.34 μm and a minimum transmission factor of 25% were prepared, one kind being those obtained by adding a metal complex (PA-1006: Mitsui Toatsu Fine) and the other without adding a metal complex. After the resultants were exposed to light using a carbon arc fade meter for 100 hours, the color difference thereof were checked. As a result, the colored patterns obtained by without adding a metal complex were 16 in color difference ΔEab*. In contrast, the colored patterns obtained by adding 0.1 and 0.16 in a weight ratio of a metal complex were 5 and 3 in color difference ΔEab*, respectively. By this, it was known that a sufficient light resistance can be obtained.

Also, dye was added to polyimide resin in a weight ratio of 0.025 to 1 to prepare a colored pattern having a thickness of 1.4 μm and a minimum transmission factor of 25%. The resultant was exposed to light using a carbon arc fade meter for 100 hours. As e. result, the colored pattern was completely faded.

Color Pattern of Cyan A triphenylmethane-based dye (acid blue 9) was added to a polyimide resin in a weight ratio of 0.1:1 to 0.2:1. By doing so, two kinds of cyan-colored pattern having a thickness of 0.38 to 0.46 μm and 25% of a minimum transmission factor were prepared, one kind being those obtained by adding a metal complex (NKX1199: Nippon Kanko Shikiso) and the other without adding a metal complex. After the resultants were exposed to light using a carbon arc fade meter for 100 hours, the color difference thereof were checked. As a result, the colored patterns obtained by without adding a metal complex were 7 in color difference ΔEab*. In contrast, the colored patterns obtained by adding the additive to the resin in a weight ratio of 0.01:1 to 0.05:1 and 0.1:1 to 0.2:1 were 6 and 3 or less, respectively, in color difference ΔEab*. By this, it was known that a sufficient light resistance can be obtained.

Also, dye was added to polyimide resin in a weight ratio of 0.025 to 1 to prepare a colored pattern having a thickness of 1.45 um and a minimum transmission factor of 25 %. The resultant was exposed to light using a carbon arc fade meter for 100 hours. As a result, the colored pattern was completely faded.

Color Pattern of Yellow

A metal-contained azo-based dye (Solvent Yellow 63) was added to a polyimide resin in a weight ratio of 0.4:1 to 0.6:1. By doing so, two kinds of yellow-colored pattern having a thickness of 0.4 to 0.45 μm and 25 to 30% of a minimum transmission factor were prepared, one kind being those obtained by adding a metal complex (PA-1006: Mitsui Toatsu Fine) and the other without adding a metal complex. After the resultants were exposed to light using a carbon arc fade meter for 100 hours, the color difference thereof were checked. As a result, the colored patterns obtained by without adding a metal complex were 9 in color difference ΔEab*.

In contrast, the colored patterns obtained by adding the additive to the resin in a weight ratio of 0.1:1 were 3 or less in color difference ΔEab*. By this, it was known that a sufficient light resistance can be obtained.

What is claimed is:

1. A color filter for a liquid crystal display, including a color filter layer containing two or more kinds of colored patterns of mutually different colors which color filter layer is coated on a transparent substrate, a minimum value of a spectral transmission factor of said color filter layer being in a range of from 4 to 40% at 420 to 610 nm, said colored patterns of said color filter layer each include resin and dye for dyeing said resin and a thickness of said colored patterns layer is 0.7 μm or less, said color filter being incorporated into a reflection type liquid crystal display device wherein light which come s into a color filter layer from one surface thereof is reflected by the other surface and allowed to pass through said color filter layer twice.

2. A color filter for a liquid crystal display as set forth in claim 1, wherein said colored patterns of said color filter layer each have a thickness just enough not to allow said dye to elute from said resin.

3. A color filter for a liquid crystal display as set forth in claim 1, wherein at least one of said colored patterns is consisting of a triphenylmethane-based material and a weight ratio of a solid portion of said resin to said dye is in a range of from 1:0.07 to 1:0.7.

4. A color filter for a liquid crystal display as set forth in claim 1, wherein at least one of said colored patterns is composed of a xanthene-based material and a weight ratio of a solid portion of said resin to said dye is in a range of from 1:0.07 to 1:0.7.

5. A color filter for a liquid crystal display as set forth in claim 1, wherein at least one of said colored patterns is composed of a cyanine-based material and a weight ratio of a solid portion of said resin to said dye is in a range of from 1:0.04 to 1:0.3.

6. A color filter for a liquid crystal display as set forth in claim 1, wherein at least one of said colored patterns is composed of an anthraquinone-based material and a weight ratio of a solid portion of said resin to said dye is in a range of from 1:0.5 to 1:1.0.

7. A color filter for a liquid crystal display as set forth in claim 1, wherein at least one of said colored patterns is composed of an azo-based material or a metal-contained azo-based material and a weight ratio of a solid portion of said resin to said dye is in a range of from 1:0.4 to 1:1.0.

8. A color filter for a liquid crystal display as set forth in of claim 1, wherein at least one of said colored patterns is obtained by adding, as additives, a solid portion of said resin and a metal complex in a weight ratio of from 1:0.01 to 1:0.3.

9. A color filter for a liquid crystal display as set forth in claim 8, wherein said metal complex includes a nickel complex, a copper complex and a cobalt complex which are composed of dialkyl phosphate, dialkyl dithiocarbanate., or benzene dithiol or analogous dithiol thereof.

10. A color filter for a liquid crystal display as set forth in claim 1, wherein at least one of said colored patterns of said color filter layer is a colored pattern consisting of yellow, and a refraction index of said colored pattern consisting of yellow is larger than that of said transparent substrate, a coating thickness of said colored pattern consisting of yellow is such that m is 2 or 3 and λ is in a range of from 550 to 580 nm in the following equation, $$d=(m\lambda)/(2n)$$

where d: coating thickness, λ: wavelength, and n: refraction index of color filter layer.

11. A color filter for a liquid crystal display as set forth in claim 1, wherein at least one of said colored patterns of said color filter layer is a colored pattern consisting of yellow, and a refraction index of said colored pattern consisting of yellow is smaller than that of said transparent substrate, a coating thickness of said colored pattern consisting of yellow is such that m is 1,2 or 3 and λ is in a range of from 560 to 590 nm in the following equation, $$d=(2m+1)\lambda/(4n)$$

where d: coating thickness, λ: wavelength, and n: refraction index of color filter layer.

12. A color filter for a liquid crystal display as set forth in claim 1, wherein at least one of said colored patterns of said color filter layer is a colored pattern consisting of magenta, and a refraction index of said colored pattern consisting of magenta is larger than that of said transparent substrate, a coating thickness of said colored pattern consisting of magenta is such that m is 2 or 3 and λ is in a range of from 430 to 470 nm in the following equation, $$d=(m\lambda)/(2n)$$

where d: coating thickness, λ: wavelength, and n: refraction index of color filter layer.

13. A color filter for a liquid crystal display as set forth in claim 1, wherein at least, one of said colored patterns of said color filter layer is a colored pattern consisting of magenta, and a refraction index of said colored pattern consisting of magenta is smaller than that of said transparent substrate, a coating thickness of said colored pattern consisting of magenta is such that m is 2, 3 or 4 and λ is in a range of from 430 to 470 nm in the following equation, $$d=(2m+1)\lambda/(4n)$$

where d: coating thickness, λ: wavelength, and n: refraction index of color filter layer.

14. A color filter for a liquid crystal display as set forth in claim 1, wherein at least one of said colored patterns of said color filter layer is a colored pattern consisting of cyan, and a refraction index of said colored pattern consisting of cyan is larger than that of said transparent substrate, a coating thickness of said colored pattern consisting of cyan is such that m is 2 or 3 and λ is in a range of from 460 to 500 nm in the following equation, $$d=(m\lambda)/(2n)$$

where d: coating thickness, λ: wavelength, and n: refraction index of color filter layer.

15. A color filter for a liquid crystal display as set forth in claim 1, wherein at least one of said colored patterns of said color filter layer is a colored pattern consisting oft cyan, and a refraction index of said colored pattern consisting of cyan is smaller than that of said transparent substrate, a coating thickness of said colored pattern consisting of cyan is such that m is 1, 2 or 3 and λ is in a range of from 460 to 500 nm in the following equation, $$d=(2m+1)\lambda/(4n)$$

where d: coating thickness, λ: wavelength, and n: refraction index of color filter layer.

16. A color filter for a liquid crystal display as set forth in claim 1, wherein said resin is a polyimide-based resin.

* * * * *